(12) United States Patent  
Gangapurkar

(10) Patent No.: US 8,762,241 B2
(45) Date of Patent: Jun. 24, 2014

(54) ONLINE QUICK KEY PAY

(75) Inventor: Srinivas Gangapurkar, Cupertino, CA (US)

(73) Assignee: Ebay Inc., San Jose, CA (US)

( * ) Notice: Subject to any disclaimer, the term of this patent is extended or adjusted under 35 U.S.C. 154(b) by 467 days.

(21) Appl. No.: 12/879,803

(22) Filed: Sep. 10, 2010

(65) Prior Publication Data

US 2012/0066090 A1  Mar. 15, 2012

(51) Int. Cl.
*G06Q 40/00* (2012.01)

(52) U.S. Cl.
USPC .................................. 705/35; 705/39; 705/40

(58) Field of Classification Search
USPC ...................................................... 705/35–45
See application file for complete search history.

(56) References Cited

U.S. PATENT DOCUMENTS 5,621,201 A * 4/1997 Langhans et al. .............. 235/380
8,630,952 B2 * 1/2014 Menon ............................ 705/44
2001/0034720 A1 * 10/2001 Armes ............................ 705/65
2002/0087467 A1 * 7/2002 Mascavage et al. ............ 705/39
2002/0120587 A1 * 8/2002 D'Agostino .................... 705/78
2004/0034596 A1 * 2/2004 Light et al. ..................... 705/40
2008/0015982 A1 * 1/2008 Sokolic et al. ................. 705/39
2008/0120229 A1 * 5/2008 Patil et al. ...................... 705/39
2011/0106668 A1 * 5/2011 Korosec et al. ................ 705/30
2012/0197740 A1 * 8/2012 Grigg et al. .................... 705/16
2012/0197743 A1 * 8/2012 Grigg et al. .................... 705/16

OTHER PUBLICATIONS

Utilizing national public-key infrastructure in mobile payment systems, Marko Hassinen, Konstantin Hypponen, Elena Trichina, Electronic Commerce Research and Applications 7 (2008) 214-231.*

* cited by examiner

*Primary Examiner* — Rajesh Khattar
(74) *Attorney, Agent, or Firm* — Haynes and Boone, LLP

(57) ABSTRACT

A quick pay option is provided so that a user can make a payment from a merchant site by simply entering in a user identifier in a pop-up window. Limits are set for the quick pay option and may vary between different merchants. The payment provider is able to determine the merchant, user, and transaction information automatically, such that the user may only be required to enter the identifier to process and complete the payment.

21 Claims, 7 Drawing Sheets

FIG. 3A

Zynga Game Network

Your shopping cart

| Item Description | Amount |
| --- | --- |
| 115 FarmCash (20.00 USD) | $20.00 |
| Total | $20.00 USD |

Review your information                                    *PayPal*

Payment method Change

Bank of America account x-1100........20.00USD
PayPal will use Visa x-1100 to fund this transaction if your bank does not have enough funds.

View PayPal policies and your payment source rights

Contact information john.doe@email.com
(408) 123-1234 Edit

☑ Enable KwikiPay one-click checkout from next time. Learn more

Setup key PINs:
3 digits each E.g. X-123 Y-786
X-[____] Y-[____]

Enter transaction limit amount
The maximum amount allowed to pay with KwiKiPay
[_____]

[PAY NOW]

Cancel and return to Farmville

FIG. 3C

Manage KwiKiPay

Use your KwiKiPay to pay instantly check out in seconds across the web.

Choose any one of below method to pay in one-click

⦿ Use Key PIN Learn more

Set your key pins:
  3 digits each E.g. X-123 Y-786
  X-[    ]  Y-[    ]

○ Use Key Note Learn more

Create your key note Need suggestions?:
  E.g. "disruptive innovation"
  [                        ]

○ Use extra secured Random PINs Learn more
  You will be asked to enter separate pairs each time when you pay.

Keys pairs: Generate another pair

| A | B | C | D | X | Y |
  |---|---|---|---|---|---|
  | 123 | 222 | 776 | 364 | 568 | 786 |

Add expiry date for your Key method:
You will be asked to setup New PINs after expiry date

[Month ▼]  [Year ▼]

Enter transaction limit amount
The maximum amount allowed to pay with KwiKiPay

[            ] USD

SUBMIT   Cancel

FIG. 3D

ONLINE QUICK KEY PAY

BACKGROUND

1. Field of the Invention

The present invention generally relates to on-line payments and more particularly to quick and easy on-line payments.

2. Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Purchasing through the Internet from the convenience of a consumer's home, office, or virtually anywhere (with mobile devices) is one main reason why on-line purchases are growing faster and faster.

Typical payment flows with on-line purchases provide the consumer with a payment or checkout button or link that is selected when the consumer is ready for payment. Once selected, such as by clicking, the consumer is taken to a new checkout or payment page. The consumer then enters any requested information and confirms payment. One disadvantage to this payment flow is that the consumer is taken away from the merchant or product page, which may lessen the consumer experience and preclude further shopping or browsing on the page. Another disadvantage is that the consumer may be required to enter information, such a user name, email address, password, PIN, credit card number, billing address, etc., which may be cumbersome and time-consuming.

These problems may be even more prevalent in small mobile devices, such as phones, having small screen sizes and keyboards or keypads. With mobile devices, the consumer may want to remain on the merchant or product/application page because Internet navigation is more difficult. Furthermore, the small keyboards/keypads make it more inconvenient to enter information onto a payment page.

Thus, there is a need for a more effective way of making on-line payments without the disadvantages discussed above.

SUMMARY

In accordance with an embodiment of the invention, a user can select a payment option on a merchant site, which pops up a smaller payment window on the site. The payment window gives the user an option of doing a quick pay by simply entering in a user-known identifier, such as a two number sequence. If the identifier is confirmed with a payment provider, the payment is processed and the payment screen disappears.

The payment provider compares the received identifier with a user identifier, which is obtained from the user's device or merchant site. If the transaction amount or other transaction details are within limits for the quick pay account, the payment provider processes the payment request.

In one embodiment, the user has the same identifier for different merchants, where different merchants can have different payment limits, different expiration dates, different funding sources, etc. The payment provider is able to automatically determine the account restrictions from a user identifier based on merchant information transmitted with the payment request.

As a result, the user can make payments quickly and easily by simply entering one piece of information (a user identifier) without leaving the merchant page. In addition, the user is able to make payments to different merchants with different account limits and restrictions using the same user identifier, which gives the user more control over payments without requiring the user to remember different identifiers for each merchant.

These and other features and advantages of the present invention will be more readily apparent from the detailed description of the embodiments set forth below taken in conjunction with the accompanying drawings.

BRIEF DESCRIPTION OF THE FIGURES

FIGS. 3A to 3D show different exemplary screen shots in various stages of a quick same screen payment process according to one embodiment;

Figure 1:
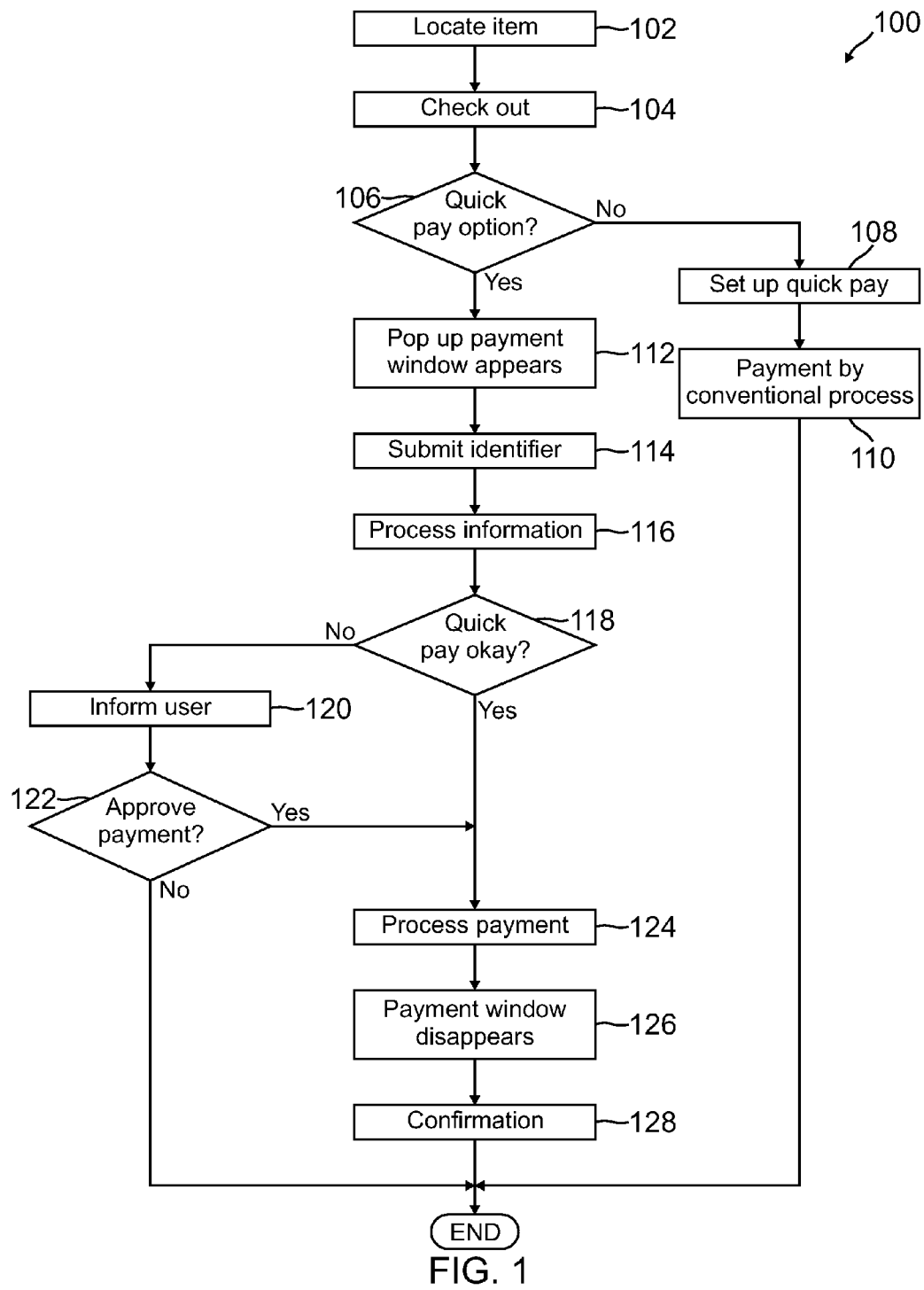
FIG. 1 is a flowchart showing a process for making a quick same screen payment according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for making an on-line payment according to one embodiment of the present disclosure. At step 102, the user or consumer locates an item or items for purchase. This can be done through any device with an Internet browser, such as a smart phone, PDA, PC, etc. Thus, an item can be located by browsing the Internet, finding an appropriate merchant or retailer site, and selecting the item for purchase. Locating an item can also include selecting an application or digital good from an on-line store. Such items are simply downloaded onto a consumer or recipient device, as opposed to a physical good that is received at a physical location. Examples of digital goods include an image, such as to send to someone else on a networking site or for personal use, such as for an avatar. Applications may include applications available through a store such as iTunes for the iPhone by Apple. Items are used broadly to include anything that a user can purchase or make a payment for on-line. This includes donations or other charitable contributions.

Once the item(s) are located, the consumer proceeds to a checkout or payment at step 104. In one embodiment, the merchant page or application detail page includes a payment button or link that the user can select when ready for checkout or payment. Selection can be made by tapping or clicking on the button. The payment button may include the name of the payment provider, such as PayPal, Inc. of San Jose, Calif. Upon selecting the button, a determination is made at step 106 whether the user has a quick pay account with the payment provider. If not, the user is taken to a page where the user can sign up for an account at step 108. This may include opening a new window for the payment provider site, which may be a pop-up window, a new window, or in a new tab. Note that if the user does not have any account with the payment provider, the user may be asked to create an account through a typical flow.

The window for user sign-up may include the user entering or selecting a user identifier and a maximum transaction amount for the quick pay feature. Other information may also be requested, such as maximum amount over a certain period, a maximum number of transactions allowed, an expiration date of the account, etc. Details of creating the quick pay account will be discussed in more detail below.

In one embodiment, once the quick pay account is created, the user can enable this feature for subsequent transactions, and payment for the current transaction is made through the user's regular account at step 110.

If the user has a quick pay account, as determined at step 106, a smaller pop-up payment window appears on the merchant site at step 112. The payment window includes a field where the user can enter a user identifier for quick pay. In one embodiment, the payment window also has a field for the user to enter a user a user name or email and/or password or PIN. In another embodiment, the user's name is included by the payment provider, such that the user need only enter the user identifier. The user name may be determined from the user device, the user login information for the merchant site, or other means. If the user name is not correct, the user may enter the correct user information. The payment window may also allow the user to select payment through the regular account instead of through quick pay.

Assuming the user name is correct and the user wants to use the quick pay option, the user enters the identifier for quick pay and submits the information at step 114 to the payment provider. The payment provider processes the information, at step 116, to determine whether to approve the payment. The processing, which will be described in more detail in FIG. 2, may include matching the received user identifier with the user name, determining the merchant or recipient of the payment, and determining whether the payment amount is within the limits of the user quick pay settings associated with the particular merchant. The payment provider may also compare information about the device the request was transmitted from (such as a phone number from a mobile device) to information corresponding to an authorized account.

If, for some reason, the payment request through quick pay cannot be authorized, as determined at step 118, the payment provider informs the user at step 120. This step is dependent on the reason or reasons why the payment request was not authorized. For example, if the user identifier did not match, the user may be requested to enter the identifier again. If the requested payment amount exceeds the quick pay limit, the user may be notified and asked to pay through the user's regular account or through a different funding instrument.

After the user is informed at step 120, the payment receives a response from the user and determines whether to authorize or approve the payment request at step 122. If approved, the payment is processed at step 124. If the request is still not approved, the transaction is terminated. A notification may be sent to the user in either situation.

If the determination at step 118 results in an authorized payment using quick pay, the user is returned fully to the merchant page at step 126. In one embodiment, the payment window simply disappears and the user proceeds with any interactions on the merchant page. In another embodiment, the payment window is replaced with a confirmation message to that the payment has been approved, where the confirmation message may automatically disappear after a certain period or the user may close the message manually.

Next, at step 124, the payment is processed. For example, a user account with the payment provider may be debited and funds transferred or credited to a merchant account. Note that if the merchant has an account with the payment provider, the payment provider can simply process the payment using information conveyed in the transaction or payment request. If the merchant does not have an account, the payment provider may ask that the merchant create an account to receive payment or credit the amount to a third party merchant account using information provided by the merchant.

An optional confirmation may be sent to the merchant and/or the user at step 128, such as in the form of a text message, email, voice message, or the like.

If the purchased item is a downloadable item, such as an application, or an add-on or enhancement to an application, the download or purchased features may be transferred automatically as soon as the payment is approved or sent. After the download is completed, the user will have the item on the device. If the purchased item is a physical good, the merchant can deliver the item by a suitable method, such as shipping or arranging a physical pick-up.

Figure 2:
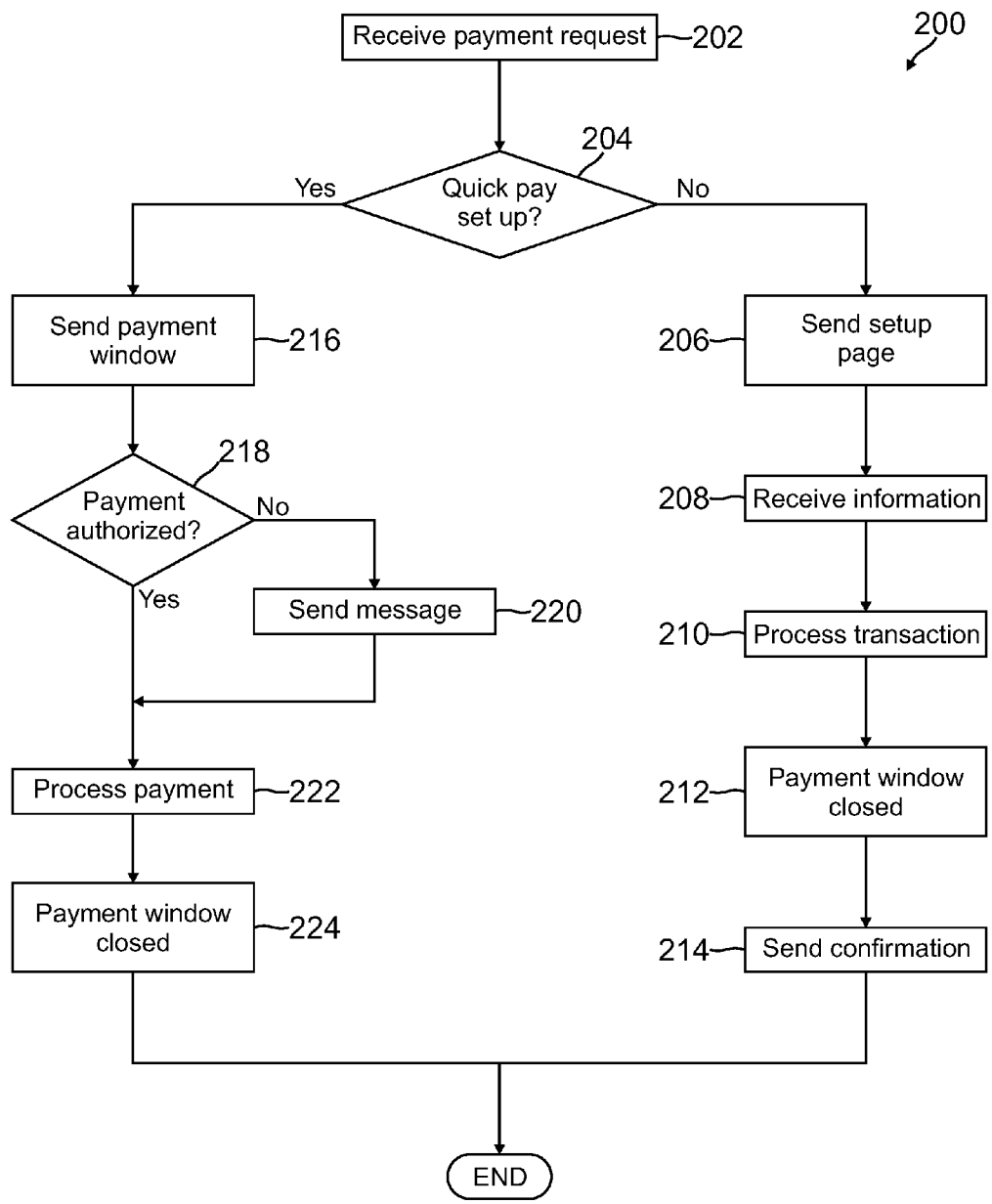
FIG. 2 is a flowchart showing a process performed by a payment provider for processing a quick same screen payment according to one embodiment.

FIG. 2 is a flowchart 200 showing steps performed by a payment provider to process an on-line payment, according to one embodiment. At step 202, the payment provider receives a payment request when the user selects a payment button or link from a merchant site. Upon receipt of the request, the payment provider determines, at step 204, whether the user has a quick pay account set up. This can be determined using information about the user conveyed with the payment request, such as a device ID, user name, etc. If no quick pay account has been created, the payment provider sends a payment page with a quick pay set up to the user on the user device at step 206.

The payment provider then receives, at step 208, information provided by the user in response to the payment page. Information may include, in various embodiments, a request to make the payment through the user's regular account, a user identification and transaction limit amount for the quick pay feature, an expiration date for the quick pay feature, a list of merchants for which this quick pay feature, limits, and expiration would apply to, and a request that the quick pay feature be enabled the next time the user goes through a check out or payment process with the payment provider. In one embodiment, the limits set would only be for that particular merchant, i.e., the merchant associated with the current transaction.

The payment is then processed at step 210. For example, the payment provider transfers the payment from the user's account and credits the merchant's account through a normal payment flow. After payment, the payment provider closes or allows the user to close the payment window, at step 212, so that the user can continue on the merchant site. The payment provider may also send, at step 214, a notification or confirmation to the user and/or the merchant that a payment has been made.

Referring back to step 204, if the user has a quick pay account, the payment provider sends quick pay payment screen to the user device at step 216. In one embodiment, the payment screen is a smaller pop-up window on the merchant page. In other embodiments, the payment screen may be opened up in a new window or tab. The payment window may request the user enter the user identifier for the quick pay feature if the user wishes to pay using quick pay, or for the user to elect to pay through the regular user account if the user desires.

In another embodiment, the quick pay account for the user is different with different merchants, even though the user identifier is the same. In that case, the payment provider first determines whether the user has a quick pay account for the particular merchant. If not, the payment provider may present the user with an option of using the same limits and settings as another one of the user quick pay accounts or setting new limits and conditions for this current merchant.

Once the payment provider receives the user response, a determination is made at step 218 whether the payment is to be authorized. The payment provider may first check whether the user is correctly associated with the quick pay user identifier. If so, the payment provider may also check whether the requested payment amount is within the limits set for the quick pay account and/or whether the quick pay account has expired.

If the payment cannot be authorized, the payment provider may send the user a message, at step 220, in an attempt to resolve the request. The message content may depend on the reason or reasons for not authorizing the request. For example, if it is because the amount requested is too high, the user may be asked if he wants to raise the limit on the quick pay account or make the payment through a normal payment flow. A raised limit may be effective immediately or not until the next transaction. If the reason for not authorization is because the quick pay has expired, the user may be asked to make the payment through a normal payment flow or set a new expiration date. Similar to the limit increase, the new expiration date may be effective immediately (i.e., for the current transaction) or not until the next transaction.

The payment provider then processes the payment or denies the request at step 222, depending on the response received from the user.

If the payment can be authorized, as determined at step 218, the payment provider processes the payment at step 222. In one embodiment, the payment provider transfers the payment amount from the user's account into an account of the merchant or recipient (minus any fees that may be incurred). If the merchant has an account with the payment provider or the payment provider has merchant account information from a third party, such as bank, the payment provider may obtain the account information through merchant information communicated in the transaction request from the user. If the merchant does not have an account with the payment provider, the payment provider may send a message to the merchant, informing the merchant that there is a payment waiting and to open an account to receive the payment. The merchant may also request the merchant to provide account information from a third party, such as a merchant bank account, so that the payment provider can transfer the funds to the designated account.

Once processed, the payment provider may remove the payment window from the merchant site at step 224, such that the user can continue with activity on the merchant site. As a result, the user may quickly make a payment with minimal interruption from the merchant site. In one example, the user only needs to enter a user identifier, which if confirmed with the transaction/merchant/user data, to process and complete the payment. The payment screen then disappears and the user proceeds on the merchant site, along with any downloads or access from the payment.

Figure 3A:
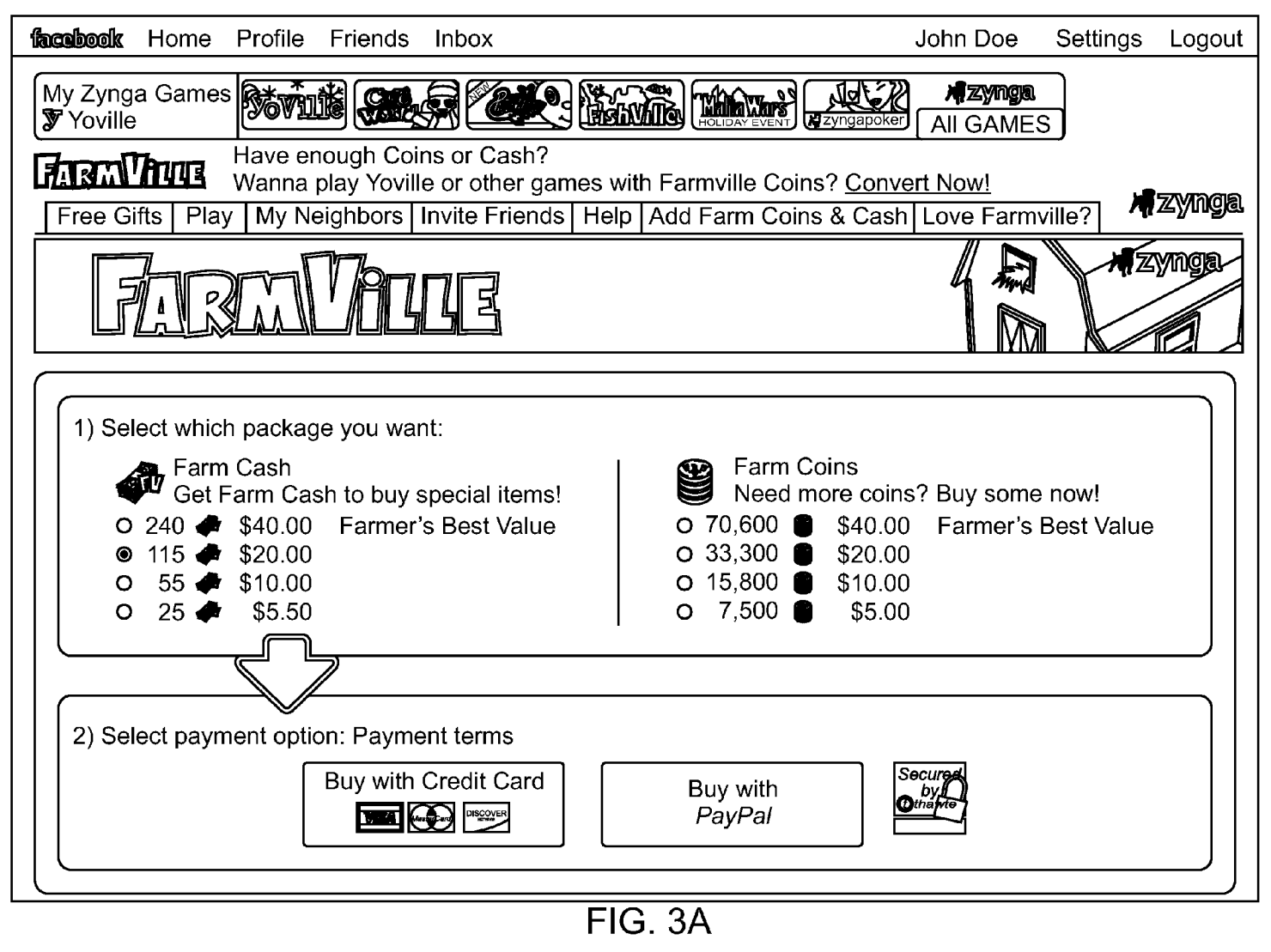
Figure 3B:

FIGS. 3A to 3D show exemplary screen shots a user sees during various steps of a quick pay process, according to one embodiment. In FIG. 3A, the user is on a merchant site and is ready to make a payment. The user sees the details about the purchase as well as options for payment. In this example, the user can pay with a credit card or with the payment provider PayPal. In FIG. 3B, the user has selected payment with PayPal. A smaller pop-up screen appears on the merchant site. The pop-up screen has the user's name, obtained by the payment provider through information conveyed when the user selected the PayPal payment option. If, for some reason, the user name is not correct, such as the user making the transaction through another person's computer or device, the user is given the option to enter the correct user name. This can be done by selecting the hyperlink "Not John?," which may direct the user to a login page for the account provider, where the user can enter a user identifier (e.g., user name, email address, phone number, etc.) and a password or PIN.

The pop-up screen also allows the user to pay through a regular payment process ("Buy with PayPal") or through the quick pay feature ("Pay with KwiKiPay"). If the user devices to pay using the normal payment flow, the user may be directed to a login page, where a password or PIN is entered, a review page is presented, and a receipt or confirmation is shown. However, if the user devices to pay with quick pay, the user enters the quick pay user identifier. In this example, the user enters a first PIN (X) and a second PIN (Y). Note that the PIN can be one or more numbers, letters, and/or characters. Other types of user identifiers may also be possible, such as a single PIN, a phrase, or other known types of user identifiers.

The payment provider processes the user identifier, the user name, and the transaction details to determine if the payment can be approved. In this example, the payment provider determines the limits of the quick pay account by accessing the account through the user name and the user identifier. If the account is merchant specific, the payment provider determines the limits for this particular merchant, i.e., Farmville. Once the account is accessed, the payment provider determines if the payment amount ($20) is within the account limits. If it is and the account has not expired, the payment provider approves and processes the payment. The pop-up screen then disappears. A separate confirmation be shown in some embodiments.

FIG. 3C is a screen shot where the user has not set up or created a quick pay account. When ready to make a payment, the user selects a payment option with the payment provider (e.g., PayPal). Assuming the user does not have quick pay (either at all or with this merchant), the user may go through a regular payment process flow, such as entering in a PIN or password (and possibly a user name if one was not automatically provided by the payment provider). Once confirmed, the user may see a confirmation page as in FIG. 3C. On that page, the user sees the details of the purchase (on the left hand side) and payment details (on the right hand side). If everything is acceptable, the user may simply select the payment button to make the payment.

The user is also given the option of using the quick pay option for subsequent transactions. The user can choose to enable quick pay by simply checking a box. One or more PINs are entered by the user, along with a maximum transaction amount. Note that other information may also be requested or requested in place of what is shown in FIG. 3C. Examples include requesting an expiration date, whether the information applies to just this merchant, to a select group of merchants, or to all merchants, providing different options for PINs, etc.

FIG. 3D is a screen shot showing a management page for the user's quick pay account. This can be accessed through the payment provider site. The same or similar management screens may also be accessible when the user sets up a quick pay account. Note that in FIG. 3D, the management screen is not merchant-specific. However, in different embodiments, limits and expiration dates can be different for different merchants.

A first part of the management page allows the user to select one of three different types of user identifiers. The first, "Key PIN," allows the user to select a set of three digit X and Y "coordinates." In other embodiments, there can be more or less coordinates, more or less digits, and different combinations of digits, letters, symbols, and/or characters. The second type, "Key Note," allows the user to enter a phrase or word. The third type, "Random PINs," provides the user with a set of six randomly generated three digit numbers, along with their associated letter identifiers. In other embodiments, the set can be less or more, the digits can be less or more, the digits can be of different lengths and/or format, and the PINs need not be restricted to digits. If the user selects this type, each time the user is ready to make a payment using quick pay, the user is asked to enter one or more of the numbers associated with one or more letters provided by the payment provider. Examples include entering X and Y numbers, B and Y numbers, the C number, A, B, and D numbers, etc. Each time the request may be random.

In addition to a user identifier type, the user may also be asked to select an expiration date for the quick pay account, such as month and year. This can provide additional security for the user. When the account is set to expire, the user may be notified to set or select new PINs, set a new expiration date, and make any other changes as desired or requested.

On this page, the user can also set a limit for the quick pay account. Here it is a per-transaction limit. However, other limits may also be set, such as number of transactions in a given period (e.g., a month), total amount of payments in a given period (e.g., a week or month), etc. The user may also enter additional information in different embodiments, as desired by the user or requested by the payment provider.

Figure 4:
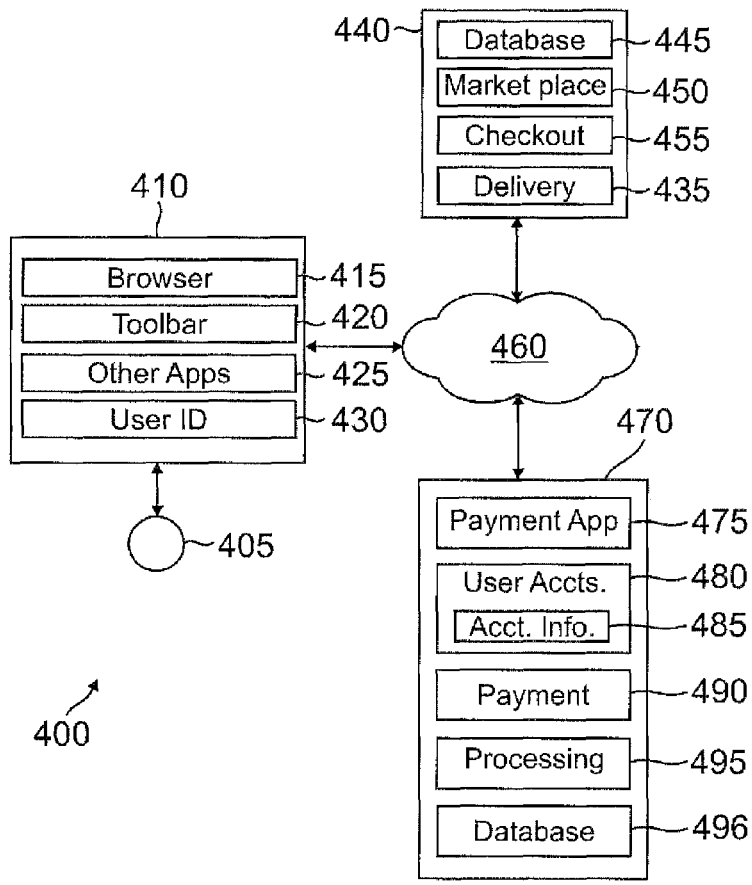
FIG. 4 is a block diagram of a networked system used in a quick same screen payment flow according to an embodiment of the invention.

FIG. 4 is a block diagram of a networked system 400 used in an on-line payment flow according to an embodiment of the invention. System 400 includes a client device 410, a merchant server 440, and a payment service provider server 470 in communication over a network 460. Payment service provider server 470 may be maintained by a payment provider, such as PayPal, Inc. of San Jose, Calif.

Client device 410, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

Client device 410 may be implemented using any appropriate combination of hardware and/or software configured for wired and/or wireless communication over network 460. For example, in one embodiment, client device 410 may be implemented as a personal computer of a user 405 in communication with the Internet. In other embodiments, client device 410 may be a smart phone, personal digital assistant (PDA), laptop computer, and/or other types of computing devices.

As shown, client device 410 may include one or more browser applications 415 which may be used, for example, to provide a convenient interface to permit user 405 to browse information available over network 460. For example, in one embodiment, browser application 415 may be implemented as a web browser configured to view information available over the Internet.

Client device 410 may also include one or more toolbar applications 420 which may be used, for example, to provide client-side processing for performing desired tasks in response to operations selected by user 405. In one embodiment, toolbar application 420 may display a user interface in connection with browser application 415.

Client device 410 may further include other applications 425 as may be desired in particular embodiments to provide desired features to client device 410. In particular, applications 425 may include a payment application and quick pay button, such as described herein for quick payments through a payment provider. Applications 425 may also include security applications for implementing client-side security features, programmatic client applications for interfacing with appropriate application programming interfaces (APIs) over network 460, or other types of applications. Email and/or text applications may also be included, which allow user 405 to send and receive emails and/or text messages through network 460. Client device 410 includes one or more user and/or device identifiers 430 which may be implemented, for example, as operating system registry entries, cookies associated with browser application 415, identifiers associated with hardware of client device 410, or other appropriate identifiers, such as a phone number. In one embodiment, user identifier 430 may be used by a payment service provider to associate user 405 with a particular account maintained by the payment service provider as further described herein.

Merchant server 440 may be maintained, for example, by an on-line merchant, digital goods seller, or application developer offering various products and/or services in exchange for payment to be received over network 460, including digital goods and applications. In this regard, merchant server 440 includes a database 445 identifying available products and/or services (e.g., collectively referred to as items) which may be made available for viewing and purchase by user 405. Accordingly, merchant server 440 also includes a marketplace application 450 which may be configured to provide information over network 460 to browser 415 of client device 410. For example, in one embodiment, user 405 may interact with marketplace application 450 through browser applications over network 460 in order to search and view various items identified in database 445.

Merchant server 440 also includes a checkout application 455 which may be configured to facilitate the purchase by user 405 of items identified by marketplace application 450. Checkout application 455 may be configured to accept payment information from user 405 and/or from payment service provider server 470 over network 460.

In one embodiment, merchant server 440 further includes a delivery application 435 which may be configured to deliver a digital or downloadable item to client device 410. For example, if user 405 purchases a downloadable item or enhancement from the merchant, delivery application 435 has the ability to transmit or download the item onto client device 410 or allow additional access to user 405 after payment is confirmed by payment service provider server 470.

Payment service provider server 470 may be maintained, for example, by an online payment service provider which may provide payment on behalf of user 405 to the operator of merchant server 440. Payment service provider server 470 includes one or more payment applications 475 which may be configured to interact with client device 410 and/or merchant server 440 over network 460 to facilitate the purchase of items by user 405 of client device 410 from a merchant operating server 440. In one embodiment, payment service provider server 470 may be maintained by PayPal, Inc.

Payment service provider server 470 also maintains a plurality of user accounts 480, each of which may include account information 485 associated with individual users. For example, in one embodiment, account information 485 may include private financial information of users of devices such as account numbers, passwords, credit card information, bank information, or other financial information which may be used to facilitate online transactions by user 405, as well as device information from a phone or PC that aids in determining whether a payment request is to be approved. Payment application 475 may be configured to interact with merchant server 440 on behalf of user 405 during a transaction with checkout application 455 and delivery application 435 to track and manage purchases made by users.

Payment service provider server 470 also includes a quick pay application 490 which may be configured to process information associated with the quick pay account, manage one or more different quick pay accounts for users, and other tasks associated with a quick pay payment transaction. A payment processing application 495 may be configured to receive payment request information via client device 410 including transaction information, merchant information, and or user information, process the payment request, and store/retrieve information as needed in a database 496. Payment application 490, processing application 495 and/or database 496 may all or part of payment application 475.

Figure 5:
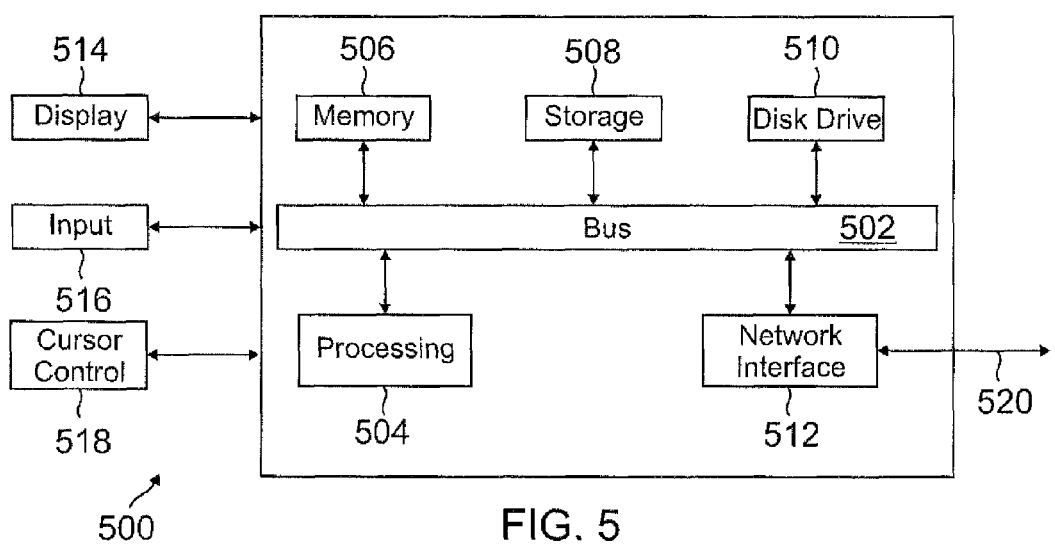
FIG. 5 is a block diagram of a computer system suitable for implementing one or more embodiments of the present disclosure.

FIG. 5 is a block diagram of a computer system 500 suitable for implementing one or more embodiments of the present disclosure. In various implementations, the user device may comprise a personal computing device (e.g., a personal computer, laptop, smart phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 500, such as a personal computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 516 (e.g., keyboard, keypad, or virtual keyboard), and a cursor control component 518 (e.g., mouse, pointer, or trackball). In one implementation, disk drive component 510 may comprise a database having one or more disk drive components.

In accordance with embodiments of the present disclosure, computer system 500 performs specific operations by processor 504 executing one or more sequences of instructions contained in system memory component 506, such as described above with respect to the consumer, merchant, and/or payment provider in FIGS. 1-3. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by a communication link 520 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 520 and a communication interface 512. Network interface component 512 may include an antenna, either separate or integrated, to enable transmission and reception via communication link 520. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and seller; however, a user or consumer can pay virtually any type of recipient, including charities and individuals. The payment does not have to involve a purchase, but can be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of performing on-line payments, comprising:
   receiving, by a hardware computer processor of a payment provider, a payment request from a user via a merchant site;
   determining, by the hardware computer processor, whether the user has a quick pay option with the payment provider;
   presenting a pop-up payment window on the merchant site, wherein the payment window comprises a field for a user identifier of the quick pay option;
   receiving information from the payment window, wherein the information comprises a user identifier for the quick pay option, the user identifier being different than a password or PIN for a user account with the payment provider; and
   processing the payment request based on the information from the payment window and on information from the payment request, wherein the processing comprises determining, based on information about the merchant, one or more limits for the quick pay option for the merchant, and wherein the user identifier is associated with a different per transaction limit or a different expiration date for the quick pay option for use with another merchant site.

2. The method of claim 1, wherein the processing is completed without further information received from the user.

3. The method of claim 1, wherein the payment window disappears after the processing is completed.

4. The method of claim 1, further comprising identifying the user, by the payment provider, in the payment window based on the information from the payment request.

5. The method of claim 1, wherein the one or more limits comprise a per-transaction limit for the merchant.

6. The method of claim 1, wherein the processing further comprises determining whether the quick pay option has expired.

7. The method of claim 1, further comprising presenting the user with a quick pay sign up page if the processor determines the user does not have a quick pay option.

8. The method of claim 7, wherein the sign up page comprises a field for the user to select or enter a user identifier for the quick pay option.

9. The method of claim 1, wherein the payment provider receives information from the user about an expiration date of the quick pay option and a type of user identifier from a plurality of different types of user identifiers.

10. The method of claim 1, wherein the user identifier comprises a first identifier and a second identifier.

11. The method of claim 5, wherein the processing further comprises determining whether the payment request is for an amount within the transaction limit.

12. The method of claim 1, wherein the payment window further comprises an option for the user to pay through a login page of the payment provider.

13. The method of claim 1, wherein the processing is completed with only the user identifier received from the user.

14. A non-transitory machine-readable medium comprising a plurality of machine-readable instructions which when executed by one or more processors of a server are adapted to cause the server to perform a method comprising:
   receiving a payment request from a user via a merchant site;
   determining whether the user has a quick pay option with a payment provider;
   presenting a pop-up payment window on the merchant site, wherein the payment window comprises a field for a user identifier of the quick pay option;
   receiving information from the payment window, wherein the information comprises a user identifier for the quick pay option, the user identifier being different than a password or PIN for a user account with the payment provider; and
   processing the payment request based on the information from the payment window and on information from the payment request, wherein the processing comprises determining, based on information about the merchant, one or more limits for the quick pay option for the merchant, and wherein the user identifier is associated with a different per transaction limit or a different expiration date for the quick pay option for use with another merchant site.

15. The non-transitory machine-readable medium of claim 14, wherein the processing is completed without further information received from the user.

16. The non-transitory machine-readable medium of claim 14, wherein the payment window disappears after the processing is completed.

17. The non-transitory machine-readable medium of claim 14, wherein the processing is completed with only the user identifier received from the user.

18. The non-transitory machine-readable medium of claim 14, wherein the one or more limits comprise a per-transaction limit for the merchant.

19. The non-transitory machine-readable medium of claim 14, wherein the processing further comprises determining whether the quick pay option has expired.

20. The non-transitory machine-readable medium of claim 14, wherein the user identifier comprises one or more of a set of randomly generated identifiers.

21. An on-line payment system comprising:
   a memory storing user account information, wherein the information comprises a password or PIN for the a user account and an identifier for a quick pay feature; and
   one or more hardware processors in communication with the memory and configured for:
      receiving a payment request from a user via a merchant site;
      determining whether the user has a quick pay option with a payment provider;

presenting a pop-up payment window on the merchant site, wherein the payment window comprises a field for a user identifier of the quick pay option;

receiving information from the payment window, wherein the information comprises a user identifier for the quick pay option, the user identifier being different than a password or PIN for a user account with the payment provider; and processing the payment request based on the information from the payment window and on information from the payment request, wherein the processing comprises determining, based on information about the merchant, one or more limits for the quick pay option for the merchant, and wherein the user identifier is associated with a different per transaction limit or a different expiration date for the quick pay option for use with another merchant site.

* * * * *